US008298972B2

(12) United States Patent
Fulton et al.

(10) Patent No.: US 8,298,972 B2
(45) Date of Patent: Oct. 30, 2012

(54) LOW IRON HIGH TRANSMISSION GLASS WITH BORON OXIDE FOR IMPROVED OPTICS, DURABILITY AND REFINING, AND CORRESPONDING METHOD

(75) Inventors: Kevin R. Fulton, Howell, MI (US); Abraham W. Michaelis, Haifa (IL); Mario Resch, Ramat Ishay (IL); David Bird, Superior Township, MI (US); Richard Hulme, Rochester Hills, MI (US); Scott V. Thomsen, South Lyon, MI (US)

(73) Assignees: Guardian Industries Corp., Auburn Hills, MI (US); Phoenicia America-Israel (Flat Glass) Ltd., Nazaret-llit (IL)

( * ) Notice: Subject to any disclaimer, the term of this patent is extended or adjusted under 35 U.S.C. 154(b) by 0 days.

(21) Appl. No.: 13/067,997

(22) Filed: Jul. 14, 2011

(65) Prior Publication Data

US 2011/0275506 A1   Nov. 10, 2011

Related U.S. Application Data

(63) Continuation of application No. 12/385,318, filed on Apr. 3, 2009, now abandoned.

(51) Int. Cl.
*C03C 6/02* (2006.01)
*C03C 3/087* (2006.01)
(52) U.S. Cl. .............................. 501/27; 501/70; 501/71
(58) Field of Classification Search ................ 501/27, 501/70, 71
See application file for complete search history.

(56) References Cited

U.S. PATENT DOCUMENTS

| | | | |
|---|---|---|---|
| 1,545,508 A | 7/1925 | Montgomery | |
| 3,306,757 A | 2/1967 | Duval | |
| 4,181,521 A | 1/1980 | Ambasz | |
| 4,944,784 A | 7/1990 | Kohli et al. | |
| 5,071,796 A | 12/1991 | Jones et al. | |
| 5,656,559 A | 8/1997 | Combes et al. | |
| 5,885,915 A | 3/1999 | Bakoet et al. | |
| 5,932,502 A | 8/1999 | Longobardo et al. | |
| 5,977,001 A | 11/1999 | Suha et al. | |
| 6,066,273 A | 5/2000 | Yamaguchi et al. | |
| 6,498,118 B1 | 12/2002 | Landa et al. | |
| 6,573,207 B2 | 6/2003 | Landa et al. | |
| 6,588,233 B2 | 7/2003 | Nattermann | |
| 6,698,244 B1 | 3/2004 | Romer et al. | |
| 6,716,780 B2 | 4/2004 | Landa et al. | |
| 6,797,658 B2 | 9/2004 | Pecoraro et al. | |
| 6,878,652 B2 | 4/2005 | Pecoraro et al. | |
| 7,169,722 B2 | 1/2007 | Landa et al. | |
| 7,560,402 B2 | 7/2009 | Thomsen et al. | |
| 7,560,403 B2 | 7/2009 | Landa et al. | |
| 7,562,538 B2 | 7/2009 | Landa et al. | |
| 7,700,869 B2 | 4/2010 | Thomsen et al. | |
| 7,858,545 B2 | 12/2010 | Landa et al. | |
| 7,863,000 B2 | 1/2011 | Tomatsu et al. | |
| 7,863,208 B2 | 1/2011 | Broughton et al. | |
| 7,893,350 B2 | 2/2011 | Thomsen et al. | |
| 2005/0202951 A1 | 9/2005 | Hulme et al. | |
| 2005/0209085 A1 | 9/2005 | Endo et al. | |
| 2007/0155610 A1 | 7/2007 | Maquin et al. | |
| 2007/0207912 A1* | 9/2007 | Hulme et al. .................... 501/65 |
| 2007/0215205 A1* | 9/2007 | Thomsen et al. ............. 136/259 |
| 2009/0088309 A1 | 4/2009 | Niida et al. | |

FOREIGN PATENT DOCUMENTS

| | | |
|---|---|---|
| EP | 0 802 168 | 10/1997 |
| JP | 2003-095691 | 4/2003 |
| JP | 2007-238398 | 9/2007 |
| WO | WO 2005/033030 | 4/2005 |

OTHER PUBLICATIONS

Machine translation of JP 2007-238398 A, Sep. 20, 2007.*
U.S. Appl. No. 12/385,318, filed Apr. 3, 2009; Fulton et al.
U.S. Appl. No. 11/365,808, filed Mar. 2, 2006, Hulme et al.
"A Study of Refining, Part 1: Measurements of the refining of a soda-lime-silica glass with and without refining agents", Cable, Glass Technology vol. 1, No. 4 Aug. 1960 (pp. 144-154).
"Minor Additions of $B_2O_3$ to Container Glass Formulations", J.P. Stevenson, Sprechsaal, vol. 126, No. 5, 1993, pp. 292-297.
Derwent Abstract 2007-713526 and Machine Translation of JP 2007-238398 A, Sep. 20, 2007.

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

This invention relates to a high transmission low iron glass that includes boron oxide. The boron oxide, added to this low iron glass, has the effect of improving glass refining, homogeneity and quality (lower seed count) through its flux action and improves glass optical parameters of green and clear glass through the change in refractive index and surface tension. Boron oxide lends to broader and weaker absorption band of such transition element(s) as iron which additionally improves the transmittance of low iron clear glass in certain example embodiments of this invention. In certain example embodiments, the addition of boron oxide in certain quantities in advantageous in that it improves the chemical durability of the glass by decreasing the USPX (or USPXIII) value of the glass via suppression of the silica, sodium ions in the glass structure.

8 Claims, 2 Drawing Sheets

| Melt ID | DOE 1-1 | DOE 1-2 | DOE 1-3 | DOE 1-4 | DOE 1-5 | DOE 1-6 | DOE 1-7 | DOE 1-8 | DOE 1-9 |
|---|---|---|---|---|---|---|---|---|---|
| Glass Melt Description | Phase 1 Check | Low Iron Dolomite and Limestone | Feldspar -> Alumina | Carbon - 0.50 | Eliminate Carbon | Add Boron to Melt 4 target | Add NaNO3 and Boron to Melt 5 | Melt 6 with MgO reduction to 2% | Melt 5 add NaNO3, Boron and Salt Cake same |
| Melt Type | Optical | Optical | Optical | Optical | Optical | Optical | Optical | Optical | Optical |
| Unit | grams | grams | grams | grams | grams | grams | grams | grams | grams |
| JORDANIAN SAND | 69.1409 | 69.3724 | 72.1848 | 72.1913 | 72.1855 | 71.3528 | 71.3591 | 72.0851 | 71.3766 |
| FELDSPAR | 4.2859 | 4.2140 | 0.0000 | 0.0000 | 0.0000 | 0.0000 | 0.0000 | 0.0000 | 0.0000 |
| SODA ASH | 22.2787 | 22.2628 | 23.0590 | 23.0611 | 23.0593 | 22.1986 | 22.0420 | 22.4054 | 21.9086 |
| DOLOMITE GOLANY | 19.9336 | 0.0000 | 0.0000 | 0.0000 | 0.0000 | 0.0000 | 0.0000 | 0.0000 | 0.0000 |
| DOLOMITE 2 WEBB SPAIN | 0.0000 | 18.8836 | 19.0488 | 19.0505 | 19.0489 | 18.8292 | 18.8309 | 9.0651 | 18.8355 |
| LIMESTONE (STANDARD) | 4.6498 | 0.0000 | 0.0000 | 0.0000 | 0.0000 | 0.0000 | 0.0000 | 0.0000 | 0.0000 |
| LIMESTONE (LOW IRON) | 0.0000 | 5.7645 | 5.8149 | 5.8154 | 5.8149 | 5.7479 | 5.7484 | 12.3903 | 5.7498 |
| SALT CAKE | 0.9502 | 0.9342 | 0.9424 | 0.9425 | 0.9424 | 0.9316 | 0.7929 | 0.9303 | 0.9319 |
| CARBON | 0.0465 | 0.0457 | 0.0461 | 0.0201 | 0.0000 | 0.0198 | 0.0000 | 0.0198 | 0.0000 |
| SODIUM NITRATE | 0.0000 | 0.0000 | 0.0000 | 0.0000 | 0.0000 | 0.0000 | 0.3964 | 0.0000 | 0.3965 |
| ALUMINA SH500 | 0.0000 | 0.0000 | 1.2432 | 1.2433 | 1.2432 | 1.3874 | 1.3875 | 2.0984 | 1.3879 |
| BORAX | 0.0000 | 0.0000 | 0.0000 | 0.0000 | 0.0000 | 2.0217 | 2.0218 | 1.9793 | 2.0223 |
| Batch Total | 121.2856 | 121.4772 | 122.3391 | 122.3242 | 122.2942 | 122.4890 | 122.5791 | 120.9336 | 122.6091 |
| Batch Target Composition | DOE 1-1 | DOE 1-2 | DOE 1-3 | DOE 1-4 | DOE 1-5 | DOE 1-6 | DOE 1-7 | DOE 1-8 | DOE 1-9 |
| SiO2 | 71.85 | 71.96 | 71.89 | 71.89 | 71.89 | 71.06 | 71.07 | 71.80 | 71.08 |
| Al2O3 | 0.86 | 0.88 | 0.88 | 0.88 | 0.88 | 0.97 | 0.97 | 1.40 | 0.97 |
| Fe2O3 | 0.0300 | 0.0230 | 0.0210 | 0.0210 | 0.0210 | 0.0210 | 0.0210 | 0.0190 | 0.0210 |
| CaO | 9.23 | 9.02 | 9.05 | 9.05 | 9.05 | 8.95 | 8.95 | 9.72 | 8.95 |
| MgO | 3.87 | 3.98 | 4.02 | 4.02 | 4.02 | 3.97 | 3.97 | 1.94 | 3.97 |
| Na2O | 13.86 | 13.85 | 13.86 | 13.86 | 13.86 | 13.79 | 13.78 | 13.90 | 13.76 |
| K2O | 0.04 | 0.04 | 0.03 | 0.03 | 0.03 | 0.03 | 0.03 | 0.03 | 0.03 |
| TiO | 0.05 | 0.05 | 0.05 | 0.05 | 0.05 | 0.05 | 0.05 | 0.05 | 0.05 |
| MnO | 0.00 | 0.00 | 0.00 | 0.00 | 0.00 | 0.00 | 0.00 | 0.00 | 0.00 |
| B2O3 | 0.00 | 0.00 | 0.00 | 0.00 | 0.00 | 0.97 | 0.97 | 0.97 | 0.97 |
| SO3 | 0.200 | 0.200 | 0.200 | 0.200 | 0.200 | 0.200 | 0.200 | 0.200 | 0.200 |
| Log 2 (°C) | 1439.1 | 1442.7 | 1441.3 | 1441.3 | 1441.3 | 1415.8 | 1416.1 | 1428.1 | 1416.5 |
| Liquidus (°C) | 1001.6 | 998.5 | 999.3 | 999.3 | 999.3 | 1000.1 | 1000.3 | 1003.1 | 1000.7 |
| USPXII | 6.41 | 6.39 | 6.37 | 6.37 | 6.37 | 5.72 | 5.71 | 6.27 | 5.70 |
| Cool Time (min) | 100.71 | 100.95 | 100.90 | 100.90 | 100.90 | 100.93 | 100.91 | 100.93 | 100.88 |
| BRN | 10.75 | 10.53 | 10.21 | 14.33 | 17.49 | 14.33 | 18.44 | 14.16 | 21.05 |
| DENSITY (g/cm3) | 2.5086 | 2.5069 | 2.5076 | 2.5076 | 2.5076 | 2.5160 | 2.5160 | 2.5086 | 2.5159 |

Fig. 1

| Melt ID | DOE 1-1 | DOE 1-2 | DOE 1-3 | DOE 1-4 | DOE 1-5 | DOE 1-6 | DOE 1-7 | DOE 1-8 | DOE 1-9 |
|---|---|---|---|---|---|---|---|---|---|
| Glass Melt Description | Phase 1 Check | Low Iron Dolomite and Limestone | Reldspar-> Alumina | Carbon - 0.50 | Eliminate Carbon | Add Boron to Melt 4 Target | Add NaNO3 and Boron to Melt 5 | Melt 6 with MgO reduction to 2% | Melt 5 add NaNO3, Boron and Salt Cake same |
| Melt Type | Optical | Optical | Optical | Optical | Optical | Optical | Optical | Optical | Optical |
| XRF Chemical Analysis | | | | | | | | | |
| SiO2BD (%) | 71.76 | 71.65 | 71.47 | 71.44 | 71.39 | 70.70 | 70.47 | 71.17 | 70.62 |
| Al2O3 (%) | 1.02 | 0.99 | 1.38 | 1.38 | 1.38 | 1.52 | 1.53 | 2.17 | 1.50 |
| Fe2O3 (%) | 0.0300 | 0.0210 | 0.0190 | 0.0190 | 0.0180 | 0.0190 | 0.0190 | 0.0180 | 0.0180 |
| CaO (%) | 9.11 | 9.12 | 9.09 | 9.00 | 9.05 | 8.91 | 9.07 | 9.82 | 9.00 |
| MgO (%) | 3.94 | 4.22 | 4.16 | 4.12 | 4.14 | 4.04 | 4.14 | 2.04 | 4.10 |
| Na2O (%) | 13.73 | 13.59 | 13.48 | 13.58 | 13.54 | 13.39 | 13.38 | 13.39 | 13.36 |
| K2O (%) | 0.030 | 0.020 | 0.010 | 0.010 | 0.010 | 0.010 | 0.020 | 0.010 | 0.020 |
| TiO2 (%) | 0.078 | 0.079 | 0.060 | 0.061 | 0.055 | 0.056 | 0.058 | 0.056 | 0.051 |
| MnO (%) | 0.0031 | 0.0038 | 0.0034 | 0.0037 | .00040 | 0.0035 | 0.0037 | 0.0040 | 0.0045 |
| SO3 (%) | 0.293 | 0.276 | 0.302 | 0.365 | 0.389 | 0.353 | 0.322 | 0.340 | 0.341 |
| Cr2O3 (%) | 0.0014 | 0.0008 | 0.0008 | 0.0009 | 0.0008 | 0.0009 | 0.0008 | 0.0006 | 0.0009 |
| BaO (%) | 0.0097 | 0.0093 | 0.0092 | 0.0090 | 0.0094 | 0.0097 | 0.0093 | 0.0094 | 0.0096 |
| B2O3 (%) - Target | | | | | | 0.97 | 0.97 | 0.97 | 0.97 |
| Optical Analysis | | | | | | | | | |
| %Te (ISO 9050) AM 1.5 @ 3.2 mm | 90.23 | 90.60 | 90.76 | 90.96 | 90.88 | 90.94 | 90.83 | 90.98 | 90.99 |
| %Te (ISO 9050) AM 1.5 @ 4.0 mm | 89.71 | 90.16 | 90.35 | 90.61 | 90.50 | 90.57 | 90.54 | 90.62 | 90.63 |
| wt % FeO Spec.Est. | 0.0045 | 0.0021 | 0.0015 | 0.0021 | 0.0015 | 0.0017 | 0.0016 | 0.0018 | 0.0006 |

Fig. 2

LOW IRON HIGH TRANSMISSION GLASS WITH BORON OXIDE FOR IMPROVED OPTICS, DURABILITY AND REFINING, AND CORRESPONDING METHOD This application is a continuation of application Ser. No. 12/385,318 filed Apr. 3, 2009 now abandoned, the entire content of which is hereby incorporated herein by reference in this application.

This invention relates to a high transmission low iron (total iron no greater than about 0.04%) glass that includes boron oxide. The boron oxide has the unexpected and surprising effect in low-iron high transmission glass of improving total solar transmission. Moreover, the boron oxide also improves glass refining, homogeneity and quality (lower seed count) through its flux action and improves glass optical parameters of green and clear glass through the change in refractive index and surface tension. Boron oxide lends to broader and weaker absorption band of such transition element(s) as iron which additionally improves the transmittance of low iron clear glass in certain example embodiments of this invention. In certain example embodiments, the addition of boron oxide in certain quantities in advantageous in that it improves the chemical durability of the glass by decreasing the USPX (or USPXIII) value of the glass via suppression of the silica, sodium ions in the glass structure.

BACKGROUND AND SUMMARY OF EXAMPLE EMBODIMENTS OF THE INVENTION

This invention relates to glass compositions having improved total solar transmission, and improved refining and/or melting characteristics. In a conventional float line process, glass batch materials are heated in a furnace or melter to form a glass melt. The glass melt is poured onto a bath of molten tin (tin bath), where the glass melt is formed and continuously cooled to form a float glass ribbon. The float glass ribbon is cooled and cut to form solid glass articles, such as flat glass sheets. For float glass, the glass batch often includes soda, lime and silica to form soda-lime-silica based flat glass.

There is a tradeoff between glass production and the cost of manufacture. In particular, it is desirable to increase the rate of glass production but at the same time it is also desirable to reduce production costs. Certain glass manufacturers are operating their glass furnaces at higher and higher throughput and temperatures to meet the increased demand for glass. However, as more glass batch is processed, more fuel is required to melt the increased amounts of glass batch thereby increasing production costs and decreasing thermal efficiency.

Certain prior art has attempted to solve these problems. For example, U.S. Pat. No. 6,797,658 (the disclosure of which is hereby incorporated herein by reference) discloses decreasing the amount of MgO in the glass composition and increasing the amount of two or more of CaO, $R_2O$ ($Na_2O$ and $K_2O$), $Al_2O_3$, and $SiO_2$ by the same amount. The '658 patent contends that the melting and/or forming temperature of the glass can be reduced in such a manner. See also U.S. Pat. Nos. 6,878,652 (decreasing MgO and increasing CaO by the same amount), and 5,071,796, the disclosures of which are hereby incorporated herein by reference. However, these compositions are problematic for numerous reasons and do not provide for the best results.

Moreover, low iron glasses are known in the art. However, when low iron glasses are provided, there exists a need in the art to improve their transmission, including both their visible transmission and their total solar transmission. Total solar transmission is discussed herein in the context of ISO 9050, AM 1.5, which is incoparated herein by reference.

In view of the above, it will be apparent that there exists a need in the art for a glass having improved total solar transmission. There is also a need for a method of making a soda-lime-silica based glass composition which may realize a reduced refining time and/or increased refining rate. In certain example instances it would be desirable to provide a glass composition that is able to realize a lower viscosity so that refining of the melt occurs faster in the float line manufacturing process, and/or a method of making such glass.

Certain embodiments of this invention relate to a method of making soda-lime-silica based low iron (total iron no greater than about 0.04%) glass, and/or glass resulting therefrom. In certain example embodiments, boron oxide (e.g., such as boron trioxide, $B_2O_3$) has the unexpected and surprising effect in low-iron, high transmission, glass of improving total solar transmission. The boron oxide also is used for improving glass refining, homogeneity and quality (lower seed count) through its flux action and improves glass optical parameters of green and clear glass through the change in refractive index and surface tension. Boron oxide lends to broader and weaker absorption band of such transition element(s) as iron which additionally improves the transmittance of low iron clear glass in certain example embodiments of this invention. Glass according to certain example embodiments of this invention may be used in solar cell applications (where increased total solar transmission is desired), or in other suitable applications such as in the context of architectural windows or the like.

In certain example embodiments, the addition of boron oxide in certain quantities in advantageous in that it improves the chemical durability of the glass by decreasing the USPX (or USPX II or USPXIII) value of the glass via suppression Of the silica, sodium ions in the glass structure. In certain example embodiments, the USPX value is reduced to no greater than about 6.0, more preferably no greater than about 5.8, and most preferably no greater than about 5.75 (conventional glass made by the assignee of this application has a USPX value of about 6.2).

The boron oxide may be introduced into the glass batch or melt in the form of one or more of boric acid ($H_3BO_3$), sodium tetraborate decahydrate ($Na_2B_4O_7 \cdot 10H_2O$), sodium tetraborate pentahydrate, sodium pentahydrate ($Na_2B_4O_7 \cdot 5H_2O$), or in any other suitable form. In certain example embodiments of this invention, the resulting soda-lime-silica based glass ends up including by weight percentage from about 0.1 to 3%, more preferably from about 0.1 to 2.5%, and most preferably from about 0.5 to 1.5% (e.g., about 1%), boron oxide (e.g., boron trioxide, $B_2O_3$). It has surprisingly been found that the use of boron oxide, and/or the form in which the same is introduced into the glass melt or batch, is advantageous in that it increases total solar transmission in low iron glasses, and permits the refining time of the glass to be substantially reduced (or the refining rate to be increased). Such glass compositions are useful, for example and without limitation; in solar cell applications, and in architectural, vehicular and/or residential glass window applications.

In certain example embodiments of this invention, there is provided a method of making soda-lime-silica based low iron glass comprising a base glass portion that includes: $SiO_2$ 67-75%, $Na_2O$ 10-20%, CaO 5-15%, $Al_2O_3$ 0-7%, $K_2O$ 0-7%, the method comprising: providing boron oxide in a glass melt used in making the glass, the boron oxide acting to increase total solar transmission of the low iron glass, reduce refining time of the glass melt; and increasing a pull rate and/or reducing residence time of the glass melt in a refining zone of a glass manufacturing apparatus, compared to a situation where no boron oxide is present. In other example embodiments of this invention, there is provided a method of making soda-lime-silica based low iron glass, the method comprising: providing boron oxide in a glass melt used in making the soda-lime-silica based glass, in order to increase total solar transmission and reduce refining time of the glass melt.

In certain example embodiments, there is provided a glass comprising:

| Ingredient | wt. % |
|---|---|
| $SiO_2$ | 69-73% |
| $Na_2O$ | 10-20% |
| CaO | 5-15% |
| MgO | 0-5% |
| $K_2O$ | 0-2% |
| total iron (expressed as $Fe_2O_3$) | 0.005 to 0.04% |
| FeO | 0 to 0.0025% |
| cerium oxide | 0 to 0.03% |
| boron oxide | 0.1 to 2.5% |
| $SO_3$ | 0.1 to 0.6% | wherein the glass has a glass redox of no greater than 0.12, a USPX value of no greater than 5.8, and a total solar transmission (ISO 9090 1.5 AM, at 3.2 mm reference thickness) of at least 90.8%. This 3.2 mm glass thickness is for purposes of reference only for purposes of total solar transmission measurement, and is not limiting as to how thick the glass may be according to the claimed invention.

IN THE DRAWINGS

FIG. 1 is a table illustrating certain low iron glass made as described herein, with DOE 1-6,1-7, 1-8, and 1-9 being according to example embodiments of this invention and the other glasses being for purposes of comparison.

FIG. 2 is a table illustrating measured XRF characteristics of low iron glasses made as described herein, with DOE 1-6,1-7, 1-8, and 1-9 being according to example embodiments of this invention and the other glasses being for purposes of comparison.

DETAILED DESCRIPTION OF CERTAIN EXAMPLE EMBODIMENTS OF THIS INVENTION

This invention relates to low iron glass compositions having increased total solar transmission and improved refining and/or melting characteristics. In a conventional float line process, glass batch materials are heated in a furnace or melter to form a glass melt. The glass melt is poured onto a bath of molten tin (tin bath), where the glass melt is formed and continuously cooled to form a float glass ribbon. The float glass ribbon is cooled and cut to form solid glass articles, such as flat glass sheets. For float glass, the glass batch often includes soda, lime and silica to form soda-lime-silica based flat glass.

The process by which bubbles are removed from glass melt when the vigorous reactions of melting are finished is called refining (or fining). The quality of refining has a significant effect on the quality of the final glass. The standards for number and size of seeds (bubbles) depend(s) on the eventual use of the glass. It is desirable to remove all seeds from the glass during the refining process; but from a practical point of view this is hardly possible and those skilled in the art strive to remove as many seeds as practically possible.

In making glass, after weighing and mixing the raw materials (e.g., sand, soda ash, dolomite, limestone, cullet, fluxes, refining and/or reducing agents), the batch is charged into the glass melt tank. The heating of the batch results in reactions between batch components, dissolution of solid grains and forming the glass melt that may still contain some un-melted batch particles. The melt is considered batch-free when all, or substantially all of, such particles are dissolved. After dissolution of most batch components, the glass melt contains dissolved gases and bubbles in sizes varying between about 20 micrometers to several millimeters. Some of these gases come from the breakdown of the raw materials, while some come from air that is entrapped between the grains of the batch. Examples gases in the bubbles include nitrogen, carbon dioxide, oxygen, sulfur dioxide, argon, and water vapor. Example mechanisms governing the refining of glass beyond batch-free time include (a) the rise of large seeds to the glass melt surface where they collapse, (b) coalescence of seeds to make bigger bubbles which rise faster when they collide, and (c) dissolution of small seeds.

The typical way of refining or fining is based on the addition of a certain amount of a compound or a combination of compounds, which start to decompose after exceeding a certain fining-onset temperature of the melt. In float glass production, sodium sulfate, or salt cake, is primarily used as a fining agent. These compounds release gas at elevated temperatures, thereby generating numerous large bubbles. As the bubbles quickly rise to the surface, they sweep the smaller bubbles in the melt along with them. For faster bubble removal, the temperature may be increased to decrease the melt viscosity to about 100 dPa·s. Fining also depends on the design and operating parameters of a furnace—the size of the refiner, the pull rate or residence time of the melt in the fining zone. Moreover, a temperature increase in general tends to accelerate refining.

In certain example embodiments of this invention, boron oxide is used as a refining or fining agent. The boron oxide is added to the batch in order to decrease seediness of the melt at the batch-free time and to reduce the time needed for complete refining. In other words, boron oxide (e.g., $B_2O_3$) is used in the glass for reducing the refining time (or increasing the refining rate) of the soda-lime-silica glass. The boron oxide may be introduced into the glass batch or melt in the form of one or more of boric acid ($H_3BO_3$), sodium tetraborate decahydrate ($Na_2B_4O_7.10H_2O$), sodium pentahydrate ($Na_2B_4O_7.5H_2O$), sodium tetraborate pentahydrate, or in any other suitable form. In certain example embodiments of this invention, the resulting soda-lime-silica based glass ends up including by weight percentage from about 0.1 to 3%, more preferably from about 0.1 to 2.5%, and most preferably from about 0.5 to 2.0% (e.g., about 1%), boron oxide (e.g., $B_2O_3$). In certain example embodiments, the glass-forming system remains basically that of basic soda-lime-silica matrix except that the introduction of boron oxide into the batch/melt suppresses other oxides such as silica, sodium oxide, which may be subject to adjustments of their amounts.

It has been found that the use of boron oxide, and/or the form in which the same is introduced into the glass melt or batch, is advantageous in that it permits the refining time of the glass to be substantially reduced (or the refining rate to be increased). The introduction of the boron oxide improve glass refining, homogeneity and/or quality (e.g., lower seed count) through its flux action and improves glass optical parameters of green and clear glass for example through the change in refractive index and surface tension thereby decreasing reflection and/or light scattering. Boron oxide (e.g., $B_2O_3$) may cause a broader and weaker absorption band of a transition element(s) such as iron which may additionally improve the transmittance of low iron clear glass in certain example embodiments of this invention. In certain example embodiments, the batch formulation may also rely on sulfate refining where, in the case of low or no dolomite introduction for example, part of all of magnesia can be introduced into the batch as Epsom salt, magnesium sulfate heptahydrate, $MgSO_4 \cdot 7H_2O$.

The term USPX is derived from Unites States Pharmacopeia (USP). In this regard, chemical durability (e.g., sodium leaching) is an area of concern and standards have been defined for measuring glass performance in this regard. In particular, ASTM C225-85, the disclosure of which is hereby incorporated herein by reference, (method P-W) discloses the technique for determining USPX values for glass. Generally speaking, ASTM C225-85 (Reapproved 1999) defines a straightforward method to measure the chemical resistance of glass in terms of USPX. The quantity of ground glass powder is immersed in 50 ml of DI water, placed in an autoclave and held at a specified temperature (121 degrees C.) for a specified time schedule. The resultant solution is titrated to determined the amount (ml) of $0.020N\ H_2SO_4$ needed to neutralized the extracted soda. The USPX number/value is the amount of acid added, reported in fractions milliliters. A lower volume of leached soda requires a low volume of acid; a low value of USPX is indicative of greater chemical resistance. Float glass when actually measured typically has a USPX value of 6.2 to 7.0 or higher. Unfortunately, over a period of days glass can be susceptible to severe staining at USPX values of 6.2-7.0 or higher.

In certain example embodiments, the addition of boron oxide in certain quantities discussed herein is advantageous in that it improves the chemical durability of the glass by decreasing the USPX (or USPX II or USPXIII) value of the glass via suppression of the silica, sodium ions in the low iron glass structure. In certain example embodiments, the USPX value is reduced to no greater than about 6.0, more preferably no greater than about 5.8, and most preferably no greater than about 5.75 (conventional glass made by the assignee of this application has a USPX value of about 6.2 or higher). This improvement resulting from the addition of boron oxide to low iron float glass is unexpected and advantageous, as it improves the durability of the glass.

Certain glasses for patterned substrate 1 according to example embodiments of this invention utilize soda-lime-silica flat glass as their base composition/glass. In addition to base composition/glass, a colorant portion may be provided in order to achieve a glass that is fairly clear in color and/or has a high visible transmission.

An exemplary soda-lime-silica glass according to certain embodiments of this invention, on a weight percentage basis, includes the following basic ingredients:

TABLE 1

EXAMPLE GLASS

| Ingredient | Preferred wt. % | More Preferred % | Most Preferred % |
| --- | --- | --- | --- |
| $SiO_2$ | 69-73% | 70-72% | 70.5-71.5 |
| $Na_2O$ | 10-20% | 12-15% | 12.75-14% |
| CaO | 5-15% | 7-12% | 8-11% |
| MgO | 0-5% | 1-5% | 2-5% |
| $K_2O$ | 0-2% | 0-1% | 0-0.3% |
| $Al_2O_3$ | 0-5% | 0.5-3% | 1-2% |

TABLE 1-continued

EXAMPLE GLASS

| Ingredient | Preferred wt. % | More Preferred % | Most Preferred % |
| --- | --- | --- | --- |
| MnO | 0-1% | 0-0.01% | 0-0.005% |
| $Cr_2O_3$ | 0-1% | 0.0001-0.05% | 0.0001-0.005% |
| total iron (as $Fe_2O_3$) | 0.005-0.04% | 0.005-0.03% | 0.005-0.020% |
| FeO | 0-0.0035% | 0-0.0020 | 0-0.0015 |
| cerium oxide | 0-0.07% | 0-0.03% | 0% |
| antimony oxide | 0-0.4% | 0-0.2% | 0-0.01% |
| boron oxide | 0.1-3.0% | 0.1-2.5% | 0.5-1.5% |
| $SO_3$ | 0.1-0.6% | 0.15-0.5% | 0.25-0.47 |
| glass redox (FeO/total iron) | <=0.15 | <=0.10 | <=0.09 |

The glass may comprise or consist essentially of the elements listed above in alternative example embodiments of this invention. An example glass reference thickness is about 3.2 mm. Other minor ingredients, including various conventional refining aids, such as carbon and the like, or titanium oxide, may also be included in the glass. In certain embodiments, for example, glass herein may be made from batch raw materials silica sand, soda ash, dolomite, limestone, with the use of sulfate salts such as salt cake (Na2SO4) and/or Epsom salt (MgSO4×7H2O) and/or gypsum (e.g., about a 1:1 combination of any) as refining agents. In certain embodiments, the glass may contain from 0.01 to 0.04% total iron, more preferably from 0.01-0.03% total iron, and sometimes from 0.01-0.02% total iron.

In certain example embodiments of this invention, the resulting glass has visible transmission of at least 75%, more preferably at least 80%, even more preferably of at least 85%, and most preferably of at least about 90% (sometimes at least 91%) (Lt D65). In certain example non-limiting instances, such high transmissions may be achieved at a reference glass thickness of about 3 to 4 mm (e.g., 3.2 mm).

In certain preferred embodiments, there is no cerium oxide in the glass. In particular, the presence of cerium oxide can have a detrimental effect on the transmission of the glass after exposure to UV and/or sunlight. This has been seen at 0.01 and 0.02% by weight. Thus, in certain example embodiments, the glass contains no cerium oxide. In certain embodiments, the resulting glass may contain from 0 to 0.01% by weight of cerium oxide. The glass is also free or substantially free of nickel in certain example embodiments of this invention. In certain example embodiments, the glass is also free or substantially free of zirconium oxide and/or zinc oxide. In certain example embodiments of this invention, the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. For instance, in certain example embodiments of this invention, the glass composition is substantially free of or free of, one, two, three, four, five or all of: erbium oxide, nickel oxide, cobalt oxide, neodymium oxide, chromium oxide, zinc oxide, zirconium oxide, and selenium. The phrase "substantially free" means no more than 2 ppm and possibly as low as 0 ppm of the element or material.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

In view of the above, glasses according to certain example embodiments of this invention achieve a neutral or substantially clear color and/or high visible transmission, although there may be a slight yellow color in certain instances. In certain embodiments, resulting glasses according to certain example embodiments of this invention may be characterized by one or more of the following transmissive optical or color characteristics when measured at a thickness of from about 1 mm-6 mm (most preferably a thickness of about 3-4 mm; this is a non-limiting thickness used for purposes of reference only) (Lta is visible transmission %). It is noted that in the table below the a* and b* color values are determined per Ill. D65, 10 degree Obs., and %τe (ISO 9050) [AM 1.5 at 3.2 mm] refers to total solar transmission.

TABLE 2

GLASS CHARACTERISTICS OF EXAMPLE EMBODIMENTS

| Characteristic | General | More Preferred | Most Preferred |
| --- | --- | --- | --- |
| Lta (Lt D65): | >=85% | >=90% | >=91% |
| % τe (ISO 9050): | >=90.6% | >=90.8% | >=90.9% |
| % FeO (wt. %): | <=0.004% | <=0.003% | <=0.0020% |
| L* (Ill. D65, 10 deg.): | 90-99 | n/a | n/a |
| a* (Ill. D65, 10 deg.): | −1.0 to +1.0 | −0.5 to +0.5 | −0.2 to 0.0 |
| b* (Ill. D65, 10 deg.): | 0 to +1.5 | +0.1 to +1.0 | +0.2 to +0.7 |

The aforesaid characteristics of the glass substrate itself As can be seen from Table 2 above, glasses for substrate 1 of certain embodiments of this invention achieve desired features of fairly clear color and/or high visible and total solar transmission, with slightly positive b* color in certain embodiments, while not requiring iron to be eliminated from the glass composition. This may be achieved through the provision of the unique material combinations described herein.

EXAMPLES 1-3

Example glasses were made according to example embodiments of this invention. Glasses of this invention may be made from batch ingredients using well known glass melting and refining techniques, unless otherwise indicated. The compositions of the glasses according to the examples are set forth in FIGS. 1-2. All amounts of ingredients are in terms of weight percentage. In particular, in FIGS. 1-2 the glasses at DOE 1-6, 1-7, 1-8, and 1-9 represent Examples 1, 2 and 3 of this invention, respectively; whereas the other glasses in FIGS. 1-2 represent comparative examples.

FIG. 1 sets forth the glass melt descriptions of the various glasses including the make-up (constant glass yield=100 g per melt) of the glass melt and the USPX value of each glass. Meanwhile, FIG. 2 illustrates the measured XRF results matrix for each of the glasses made in accordance with FIG. 1. Boron oxide was added in Examples 1-3, but was not present in the comparative examples in FIGS. 1-2. It can be seen in Examples 1-3 (i.e., DOE 1-6, 1-7, 1-8, and 1-9) in FIG. 2, that the addition of the boron oxide surprisingly improves (increases) the total solar transmission (Vote (ISO 9050)) of the low iron (total iron no greater than 0.04%) glass. Generally speaking, the low iron glasses having boron oxide had higher total solar transmission than those not having the boron oxide. Additionally, it can be seen in FIG. 1 that the addition of the boron oxide to the low iron glasses surpringly resulted in an improved (lower) USPX value. In the comparative low iron glasses in which no boron oxide was present (DOE 1-1 through 1-5), the USPX values were from 6.37 to 6.41. Meanwhile, in Examples 1-3 (i.e., DOE 1-6,1-7, 1-8, and 1-9) in FIG. 1, the USPX values were improved (decreased) and ranged from 5.70 to 6.27. Thus, it can be seen that the addition of the boron oxide to the low iron glass improved both the USPX values and the total solar transmission of these particular types of glasses.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color. Deep oxidation in certain example embodiments of this invention may be achieved by operations adjustments and chemically by introduction of sulfates in the form of one or more of salt cake (e.g., $Na_2SO_4$), Epsom salt (e.g., $MgSO_4 \times 7H_2O$) and/or gypsum in significant amounts and combination of one or more of these with potassium and/or sodium nitrate. The salt cake may be referred to in the final glass as $SO_3$. The high amounts of salt cake used in certain example embodiments, can be seen from the large amounts of $SO_3$ mentioned herein with respect to the final glass composition. In particular, one or more of these oxidizing elements are added to the glass batch in amount(s) sufficient to cause the glass batch to realize a batch redox of from about +12 to +30 in certain example embodiments of this invention, even more preferably from about +15 to +30, and most preferably from about +20 to +30 in certain example embodiments. It is noted that batch redox is different than glass redox. Batch redox is known in the art as being generally based on the following. Each component of the batch is assigned a redox number, and the batch redox is calculated as the sum total of the same. The batch redox number is calculated before the glass is made, from the batch. A detailed discussion of "batch redox" and how it is determined is provided in *The redox number concept and its use by the glass technologist*, W. Simpson and D. D. Myers (1977 or 1978), which is incorporated herein by reference. In contrast with batch redox, glass redox is calculated after the glass has been made from spectral data or the like, and is a ratio of % FeO to total iron in the glass. The high batch redox discussed above causes iron in the ferrous state ($Fe^{2+}$; FeO) to oxidize to the ferric state ($Fe^{3+}$) and thus causes an amount of the strong blue-green colorant of ferrous iron ($Fe^{2+}$; FeO) to oxidize into the weaker yellow-green ferric iron colorant (Fen during the glass melt (note: some ferrous state iron may remain in the resulting glass). The aforesaid oxidation of the iron tends to reduce coloration of the glass, reduces % FeO, and causes visible transmission, % UV and % TS to increase. Any yellowish color caused by oxidation of iron into ferric state ($Fe^{3+}$) iron (i.e., positive b*) may be acceptable in solar cell applications and need not be compensated for by addition of other colorants thereby saving cost in certain example embodiments of this invention.

It will be appreciated by those skilled in the art that the high batch redox results in a glass with a lower "glass redox" value (i.e., less iron in the ferrous state FeO). In this regard, the proportion of the total iron in the ferrous state (FeO) is used to determine the redox state of the glass, and redox is expressed as the ratio $FeO/Fe_2O_3$, which is the weight percentage (%) of iron in the ferrous state (FeO) divided by the weight percentage (%) of total iron (expressed as $Fe_2O_3$) in the resulting glass. Due to at least the presence of the oxidizing agent(s), the glass redox of glass according to certain example embodiments of this invention is low as mentioned above, and the amount of iron in the ferrous state (FeO) will also be low as discussed above.

Glass is provided herein which may be used in photovoltaic (e.g., solar cell) applications. However, the use of the glass discussed herein is not so limited. Glass described herein may instead or also be used in applications such as windows, shower doors, and the like in certain example embodiments of this invention.

Once given the above disclosure many other features, modifications and improvements will become apparent to the skilled artisan. Such features, modifications and improvements are therefore considered to be a part of this invention, the scope of which is to be determined by the following claims:

What is claimed is:

1. Glass batch comprising:

| Ingredient | wt. % |
| --- | --- |
| $SiO_2$ | 69-73% |
| $Na_2O$ | 10-20% |
| CaO | 5-15% |
| MgO | 0-5% |
| $K_2O$ | 0-2% |
| total iron (expressed as $Fe_2O_3$) | 0.005 to 0.04% |
| FeO | 0 to 0.0035% |
| cerium oxide | 0 to 0.03% |
| boron oxide | 0.1 to 2.5% |
| $SO_3$ | 0.1 to 0.6% | wherein the glass composition in the glass batch has a batch redox of from about +15 to +30.

2. The glass batch of claim 1, wherein the glass batch comprises:

| | |
| --- | --- |
| total iron (expressed as $Fe_2O_3$) | 0.005 to 0.03% |
| boron oxide | 0.5 to 1.5%. |

3. The glass batch of claim 1, wherein the glass batch is substantially free or free of each of erbium oxide, nickel oxide, cerium oxide, cobalt oxide, zirconium oxide, zinc oxide, neodymium oxide, and selenium.

4. The glass batch of claim 1, wherein the glass batch is substantially free or free of erbium oxide, cerium oxide, zirconium oxide, zinc oxide, and nickel oxide.

5. The glass batch of claim 1, wherein the glass batch comprises from 0 to 0.0020% FeO.

6. The glass batch of claim 1, wherein the glass batch is substantially free of four or more of erbium oxide, nickel oxide, cobalt oxide, neodymium oxide, chromium oxide, cerium oxide and selenium.

7. The glass batch of claim 1, wherein the glass batch is substantially free of seven or more of erbium oxide, nickel oxide, cerium oxide, cobalt oxide, neodymium oxide, zirconium oxide, zinc oxide and selenium.

8. The glass batch of claim 1, wherein the glass batch is substantially free of erbium oxide, cerium oxide, zirconium oxide, zinc oxide and nickel oxide.

* * * * *